United States Patent [19]

Prydtz et al.

[11] Patent Number: 5,301,790
[45] Date of Patent: Apr. 12, 1994

[54] SORTING AND STORAGE SYSTEM FOR PIECES OF GOODS SUCH AS FLIGHT LUGGAGE

[75] Inventors: Ole Prydtz, Hjortshoj; Uffe Lykkegaard, Arhus C; Ralph Kofoed, Hornslet, all of Denmark

[73] Assignee: Kosan Crisplant A/S, Arhus N, Denmark

[21] Appl. No.: 899,878

[22] Filed: Jun. 17, 1992

[30] Foreign Application Priority Data

Jun. 18, 1991 [DK] Denmark ............... 1171/91

[51] Int. Cl.⁵ ............................................. B65G 47/46
[52] U.S. Cl. .............................. 198/349; 198/465.1; 198/365; 209/698
[58] Field of Search .............. 198/365, 349, 465.1, 198/465.2, 803.01; 209/698

[56] References Cited

U.S. PATENT DOCUMENTS

| | | | |
|---|---|---|---|
| 3,463,298 | 8/1969 | Harrison | 198/365 |
| 3,610,159 | 10/1971 | Fickenscher | 198/349 |
| 3,776,395 | 12/1973 | Lingg et al. | 198/465.2 |
| 3,880,298 | 4/1975 | Habegger et al. | 198/349 |
| 4,249,652 | 2/1981 | Brems | 198/465.1 |
| 4,291,797 | 9/1981 | Ewertowski | 198/365 |
| 4,359,149 | 11/1982 | Erlichman et al. | 198/465.2 |

*Primary Examiner*—Joseph E. Valenza
*Attorney, Agent, or Firm*—Antonelli, Terry, Stout & Kraus

[57] ABSTRACT

In a sorting system for flight luggage it it well known to put individual pieces of luggage in totes (4) which are entered onto a conveyor with sideways tiltable carrying platforms (2), whereby the pieces of luggage may be selectively unloaded from the totes at their destinations (D1,D2) or at a storage unit (W) where the totes are released and stored with their content for later re-introduciton into the sorting system. This known art has required a particular construction of the sorting conveyor with a large-angle tilt and a complex mechanism for releasibly holding the totes. According to the invention the totes have upper surfaces (8) which are of a concave shape in order that the pieces of goods may be slid off the totes while secured, at the same moderate angle required for the sliding-off at the storage unit. Hence the conveyor itself may be quite conventional, at the same time as the holding mechanism may be limited to mere retractable flanges (14) on the sides of the carrying platform.

7 Claims, 1 Drawing Sheet

SORTING AND STORAGE SYSTEM FOR PIECES OF GOODS SUCH AS FLIGHT LUGGAGE

BACKGROUND OF THE INVENTION

The present invention is generally related to a sorting and storage system for pieces of goods, such as flight luggage, and more particularly to means permitting great flexibility when re-scheduling aircraft.

Sorting systems are in common use, which enable automatic sorting and distribution of pieces of goods from one or several feed stations to a greater or lesser number of receiving stations, such as from a check-in area to the various receiving stations near the parking areas of the aircraft. Usually sorters are used which have conveyors using sideways tiltable carrying trays or platforms which are activated to tilt by central control based on destination codes read at the relevant destinations.

It may occur that changes of flight schedule cause transfer of receiving station because a different aircraft has been selected. In this situation it is quite simple to change destination for newly-arrived luggage, but if a large number of pieces have already been transferred to a receiving station they have to be re-transferred, either by returning them all to the feed station or by separate transfer directly to the relevant new destination. On this basis a system has been developed that incorporates a storage unit to which checked luggage is sent and where it is kept as long as there is a possibility that a new destination might be required. As soon as the final decision has been made, all the checked luggage may then automatically be distributed from the storage unit to delivery at the correct destination.

In principle the automatic handling of the goods may be performed by acting directly on the pieces of luggage, but in particular for safe handling in the storage unit it has been found to be advantageous to place the pieces of luggage in individual carriers, so-called "totes". These are shallow boxes which may receive pieces of luggage up to a certain area, e.g. corresponding to the largest suitcases that will be encountered. These "totes" may be equipped with the necessary means to cooperate with suitable transportation means on the conveyors, such as trays or platforms, in order to obtain the desired result.

In these more advanced systems higher demands are put on the components, because emptying of goods from the "totes" must occur by noticably greater tilt of the transportation means of the conveyor while the "totes" themselves must be held securely but releasably on the transportation means when they are to be discharged in the storage unit. This has lead to greater complexity of the systems, and their construction can only be based on existing sorting and storage systems after complex and expensive modifications.

OBJECTS OF THE INVENTION

Accordingly, it is an object of the invention to provide a unique system of this kind which is distinguished by great simplicity and which may use exsisting systems with only slight modification.

It is another object of the invention to provide a unique type of tote for use in such a system.

It is a further object of the invention to provide release means for selective discharge of totes.

The invention is based on the observation that individual discharge of the goods in the "totes" does not require a tilt which is larger than usual when the inside bottom is shaped as a shallow curve with a surface made of a low-friction material such as polyethylene.

DETAILED DESCRIPTION OF THE PREFERRED EMBODIMENT

Figure 1:
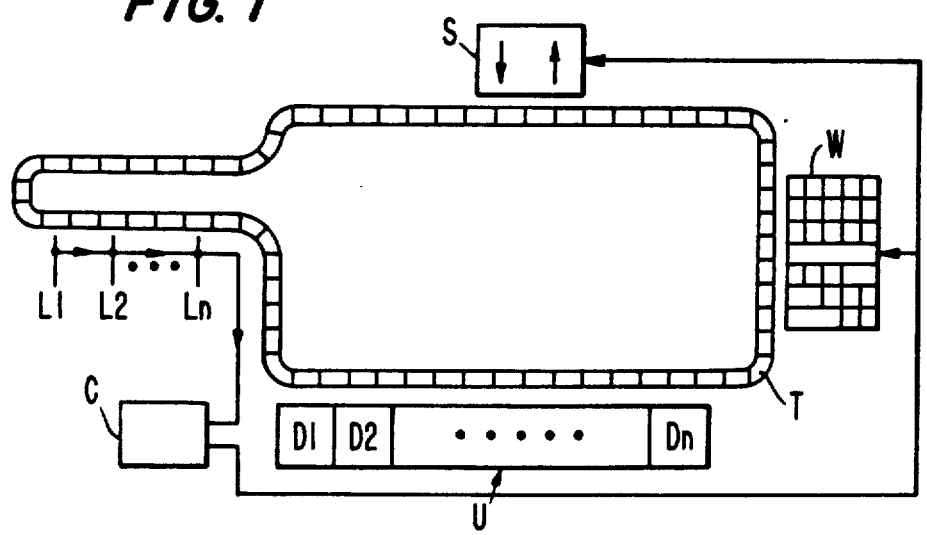
FIG. 1 is a schematic drawing of a sorting and storage system according to the invention.

Referring to FIG. 1, there is shown an endless conveyor type transport mechanism T which receives goods in the form of individual pieces of luggage at loading bays L1, L2, . . . Ln where they are loaded onto totes which are carried by platforms fixed tiltably on the transport mechanism (details shown in FIG. 2). The totes with their content are identified electronically or otherwise by a controller C in such a way that they will be emptied when they reach their respective destinations or unloading bays D1, D2, . . . Dn at the unloading U station which may be regarded as the sorting part of the system. In case the destination may still be changed, the totes with content are carried to a store W where they wait until needed. If a depletion of the number of totes circulating by means of the conveyor threatens to reduce efficiency, surplus empty totes my be supplied from a store S.

Figure 2:
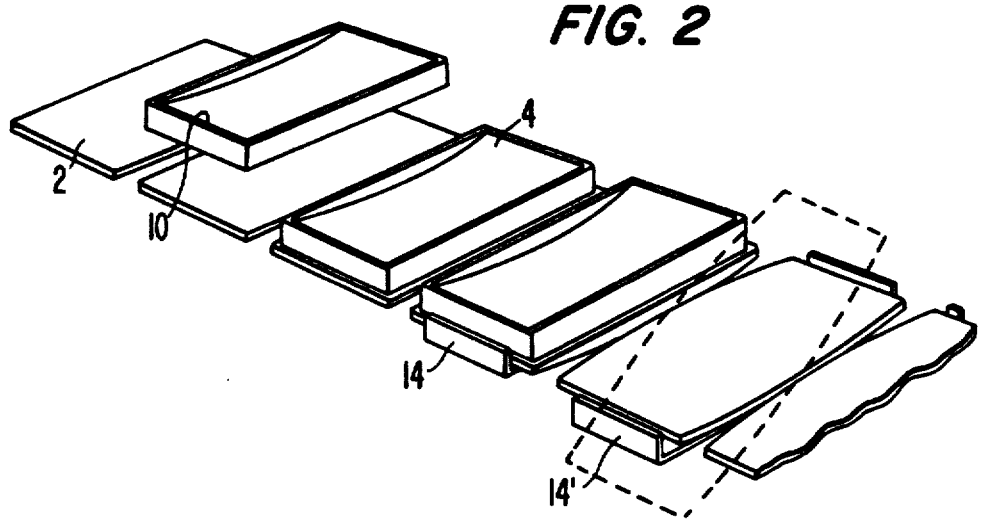
FIG. 2 is a perspective view of part of a conveyor displaying the relationship between platforms and totes.

Referring now to FIG. 2, a part of the conveyer is shown as consisting of an interconnected line of carrying platforms or trays 2 which may be tilted to one side, as indicated by dotted lines (14') in the righthand side of the drawing, in order to obtain unloading of an object carried by the conveyer at any desired place along the conveyor, which is well-known. The individual platforms 2 are supplied with carrying trays or totes 4 which, according to the invention are have vertical sides 6 and a bottom area which is curved between the opposing narrow sides 10. The bottom 8 is made in a material having a low friction such as polyethylene.

Figure 3:
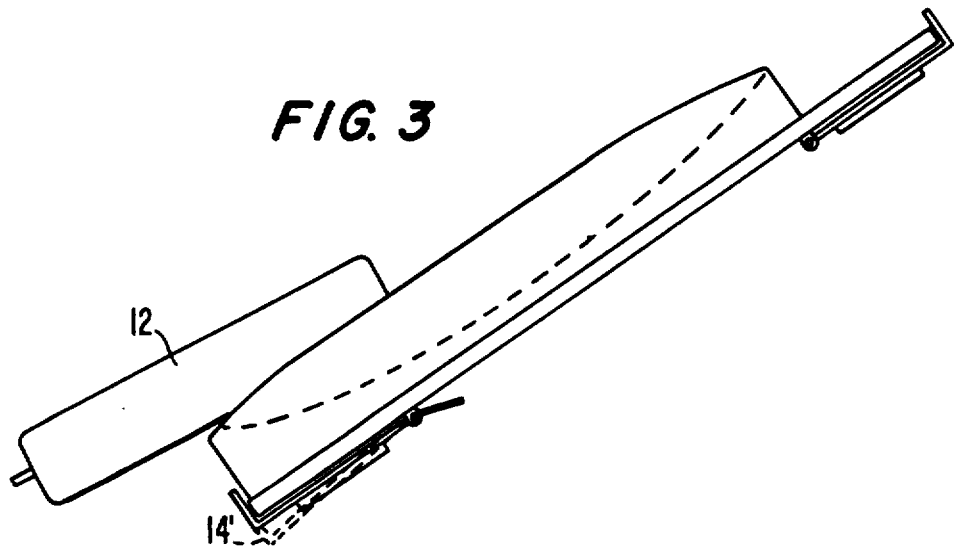
FIG. 3 is side view of a tote under tilt discharging a piece of luggage.

When the totes 4 are fitted to the carrying platforms 2, a tilting of the latter will allow objects which are loosely placed on the curved bottoms 8 to be unloaded by sliding as is shown in FIG. 3 which relates to a suitcase 12. This would correspond fully to the traditional manner of sorting goods where the objects 12 are placed directly on the carrying platforms 2. It has been demonstrated that it is possible to obtain a safe unloading of the objects 12 without the need to tilt the carrying platforms 2 more than usually which means that the entire lower part of the sorting conveyer with its associated means for tilting may be retained unchanged. Although due to the curved bottom the angle of tilt will be slightly less than by free sliding from the carrying platform 2, it is of only minor importance, in particular with a very low friction of the surface, and the objects 12 on the totes will still be secured against sideways movement (standard conveyance without tilt) caused by vibrations and similar sideways influences.

It is, however, also the intention that the totes 4 with a content shall be unloadable by means of said tilt, viz. in case of deposit in a storage unit W, and the totes must be selectively releasably fitted to the carrying platforms 2. Since the invention provides for the possibility of continuing to use a tilt of the value established for traditional conveyors, e.g. 35 degrees, it has been realized that it is not required to fit the totes 4 to the platforms by any direct means, as long at it is ensured that the totes may be releasably prevented from sliding off the carrying platforms. This is very simply obtained by providing the carrying platforms 2 with elements which are switchable between two positions, a first position in which they are protruding in order to cooperate with suitable bottom parts of the totes 4 to prevent sliding, and a second position in which they are retracted in order to permit sliding of the tote 4.

In a preferred embodiment as is shown in FIG. 2 and FIG. 3, the carrying platforms are supplied with upwardly oriented, loose end-flanges 14 which will prevent sideways sliding of the tote 4 and which are provided with suitable means (not shown) to retract these flanges, as is shown at 14' in FIG. 2 and with dotted lines in FIG. 3.

In this embodiment a sideways tilt of a carrying platform 2 will cause unloading of the piece of goods 12 if the blocking side flange 14 is in its protruding position while the identical tilt will cause unloading of the tote 4 with its piece of goods 12 if the blocking flange 14 is retracted. Undoubtedly the piece of goods 12 will attempt to leave the tote 4 as described, but before this occurs, the entire tote 4 together with the piece of goods 12 will have left the carrying platform 2 so that the combined unit 4, 12 may be loaded into a storage unit (not shown), from which it may later be collected for distribution by the conveyor.

The solution according to the invention is very simple as compared to the state of the art, in that it is sufficient to provide a releasable block against sideways sliding of the totes 4, while these are otherwise totally unrestrained in their placement on the carrier platforms 2, and it is definitely practicable to provide the total number of carrying platforms 2 with totes 4 as well as moveable side flanges 14.

It will be understood that the movable side flanges 14 are supposed to be actively blocking along most of the length of the sorting conveyor, except for the part extending along the storage unit, where these flanges 14 shall be retracted in order to permit the sliding-off of the totes 4 with their content. The carrying platforms 2 from which this storage unloading shall take place will be tilted sideways in this area, and it will hence be quite a simple matter to activate the flanges 14 to a retracted position in response to the passing of activating means connected to the carrying platforms, e.g. when making contact with a fixed abutment placed by the unloading station. These activating means would not be influenced by carrying platforms which are not tilted. This activation must, however, take place within a short period of time after tilting has commenced, or possibly selectively already prior to tilting, in order to obtain unloading of the tote 4 with its content rather than unloading of the piece of goods from the tote 4. This detail, to retract the flange 14 either selectively through the passage of the carrying platform 2 or generally by the passage of carrying platforms which have already commenced a tilt may be devised by the person skilled in the art in a multitude of ways and will not be discussed in detail here. The retraction may be entirely mechanical, as may be the tilting of the carrying platform, or it may be performed selectively by means on an electromagnet on the individual carrying platforms.

When the totes have been unloaded to the storage unit W, the carrying platforms 2 are left without totes. It is a simple matter to provide empty totes 4 further along the conveyer, such as it is shown at S in FIG. 1, however the conveyor must have a tote store number of "empty slots", i.e. empty carrying platforms 2 onto which to fit totes 4 with pieces of goods when emptying the storage unit. Hence, normally it would not be required to have more totes 4 than there is room for on the total number of carrying platforms 2. There is, however, no deviation from the spirit of the invention in providing a automatically operated separate store for empty totes 4 which may supplied according to demand. This would create a situation where a number of totes 4 are tied up in the storage unit W while all carrying platforms are already supplied with totes 4. If it becomes suddenly necessary to empty the storage unit. This requires that totes 4 are removed into the tote store S in synchrony with the emptying of totes 4 at the unloading bays D1, D2 ... Dn. In this manner it is possible to work in the combined system with an optimal, minimal number of totes 4 determined by the operating conditions of the conveyorsorter.

It must be noted, however, that the system will often be used in a manner which deviates somewhat as compared to the above description. In many cases it will not be relevant to let the conveyor/sorter itself pass along a series of check-in stations, in particular because this would make this particular construction much longer than necessary and hence too expensive. The present conveyor/sorter and the related storage unit may advantageously be kept in a separate area and would receive the goods or luggage from the check-in area by a long but very simple traditional conveyor.

There should be a supply of totes 4 at the check-in stations which will be filled with individual pieces of luggage and and put on the simple transport conveyor. Each tote 4, being supplied with a coding unit, e.g. of an electronic nature which may be programmed with an individual destination code, is carried by the simple transport conveyor to the conveyor/sorter which unloads the pieces of goods at the correct unloading bays.

In case the goods is determined to be in very good time for the relevant destination, the unloading will take place in the storage unit W, and the tote 4 with its piece of goods 12 is unloaded. When the timing is such that it is completely determined which unloading bay D1,D2 ... Dn; is relevant for a particular flight, the totes 4 with the goods are collected by the conveyor/sorter at the storage unit W by a re-load mechanism, carried to the relevant un-loading bay, and emptied from the totes as above described.

The now empty totes 4 are carried by the carrying platforms and themselves unloaded for distribution to the check-in stations. In this embodiment the tote store is dispensed with, but the complete conveying system may still contain many more totes 4 than would fit simultaneously on the conveyor/sorter. The remainder would be stored at the check-in stations, ready for use.

The encoded destinations for the now emptied totes 4 may be deleted automatically, e.g. during the unloading operation or as the new destination is encoded during re-use of the tote at the check-in station.

I claim is:

1. A process for sorting an interim storage of pieces of goods in dependance upon a precoded destination of the respective pieces of goods, the process comprising the steps:

individually placing respective pieces of goods on coded totes respectively releasably mounted on individual platforms of an endless conveyor at individual check-in stations;

moving the pieces of goods from the check-in stations to one of designated unloading bay or a storage unit adapted to receive the totes accommodating the individual pieces of goods;

selectively tilting the respective platforms at the designated unloading bay based upon the precoded destination for the respective pieces of goods for discharging the pieces of goods from the respective totes;

selectively releasing the respective totes with the respective pieces of goods therein at a storage unit;

removing the totes with the pieces of goods thereon from the storage unit and transferring the removed totes to platforms of the endless conveyor in dependance upon a timing of reception of the pieces of goods and a prescheduled forwarding of the pieces of goods to a designated unloading bay;

releasing respective empty totes from the respective platforms at a collecting station prior to a transport to the respective check-in stations, and wherein the step of releasing includes removing an interlock between the individual carrying platforms and associated totes.

2. A process according to claim 6, wherein the releasing of the interlock is achieved by lifting and retracting moveable flanges mounted on said carrying platform.

3. A system for sorting an interim storage of pieces of goods in dependance upon precoded destinations of the respective pieces of goods, the system comprising:

an endless conveyor including a plurality of carrying platforms;

totes for receiving individual pieces of goods, said totes being releasably mounted on the respective carrying platforms;

means for preventing a transverse sliding of the totes with respect to respective carrying platforms;

at least one check-in station for supplying the individual pieces of goods to the respective totes;

at least two unloading stations for receiving the respective pieces of goods in dependance upon the precoded destinations;

means for discharging the pieces of goods from the respective totes at the designated unloading stations;

at least one storage unit for receiving totes accommodating pieces of goods in dependance upon a timing of reception of the pieces of goods and a prescheduled forwarding of the pieces of goods to a designated unloading station;

at least one collection station for receiving empty totes prior to a transport of the received empty totes to the at least one check-in station, wherein said means for preventing includes an interlock provided on the respective carrying platforms, said interlock being releasable at said collecting station, wherein said totes are generally box shaped and have boundaries along a direction of travel of the carrying platforms, and inside bottom of each of said totes has a shallow concave shape as viewed in a direction perpendicular to the direction of travel of the carrying platforms, and wherein said means for preventing include elements for restricting transverse sliding movement without influencing a relationship between the respective carrying platforms and associated tote.

4. A system for sorting and storage according to claim 3, wherein said means for preventing includes retractable vertical side flanges for releasing the respective totes at the at least one collection station.

5. A tote for use in a system for sorting and storage according to claim 3, wherein at least a top surface of the bottom of the respective totes is fashioned a material of a low coefficient of friction.

6. A system for sorting and storage according to claim 3, wherein means are provided for tiling the carrying platform at the designated station for enabling discharging of the piece of goods on the associated tote at the designated station.

7. A system for storing and storage according to claim 6, wherein the pieces of goods include flight luggage and cargo.

* * * * *